United States Patent
Nakamura et al.

(12)

(10) Patent No.: US 6,620,753 B2
(45) Date of Patent: Sep. 16, 2003

(54) DIELECTRIC CERAMIC, PROCESS FOR PRODUCING THE SAME AND MULTILAYER CERAMIC CAPACITOR

(75) Inventors: Tomoyuki Nakamura, Yasu-gun (JP); Kentaro Sakai, Yasu-gun (JP); Harunobu Sano, Kyoto (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 149 days.

(21) Appl. No.: 09/982,361

(22) Filed: Oct. 18, 2001

(65) Prior Publication Data

US 2002/0072464 A1 Jun. 13, 2002

(30) Foreign Application Priority Data

Oct. 24, 2000 (JP) ........................................ 2000-323669
Aug. 10, 2001 (JP) ........................................ 2001-243451

(51) Int. Cl.[7] ........................ C04B 35/46; C04B 35/462; C04B 35/465; C04B 35/48; H01G 4/12
(52) U.S. Cl. ........................ 501/137; 501/134; 501/135; 501/136; 501/138; 501/139; 361/321.2; 361/321.4
(58) Field of Search ................................. 501/134, 135, 501/136, 137, 138, 139; 361/321.2, 321.4

(56) References Cited

FOREIGN PATENT DOCUMENTS

| EP | 0785561 A2 | 7/1997 |
|---|---|---|
| GB | 2340488 A | 2/2000 |
| GB | 2352446 A | 1/2001 |
| JP | 04265272 | 9/1992 |
| JP | 5-9066 | 1/1993 |
| JP | 5-9067 | 1/1993 |
| JP | 5-9068 | 1/1993 |
| JP | 6-5460 | 1/1994 |
| JP | 07272973 | 10/1995 |
| JP | 9-270366 | 10/1997 |

*Primary Examiner*—Elizabeth D. Wood
(74) *Attorney, Agent, or Firm*—Dickstein, Shapiro, Morin & Oshinsky LLP (57) ABSTRACT

A dielectric ceramic includes $ABO_3$ as a major component and R and M as accessory components, where A is at least one of Ba, Sr and Ca; B is at least one of Ti, Zr and Hf; R is at least one of La, Ce, Pr, Nd, Sm, Eu, Gd, Tb, Dy, Ho, Er, Tm, Yb, Lu and Y; and M is at least one of Ni, Co, Fe, Cr and Mn. The dielectric ceramic contains the components R and M at about 70% or more of analysis points in grain boundaries. This dielectric ceramic is suitable for use in dielectric ceramic layers of a multilayer ceramic capacitor obtained by firing in a reducing atmosphere, has a long life at high temperatures and high voltages, exhibits less time-dependent change in electrostatic capacity under application of a direct-current voltage and has satisfactory reliability even when its thickness is reduced.

20 Claims, 3 Drawing Sheets

DIELECTRIC CERAMIC, PROCESS FOR PRODUCING THE SAME AND MULTILAYER CERAMIC CAPACITOR

BACKGROUND OF THE INVENTION

1. Field of the Invention

The present invention relates to a dielectric ceramic, a process for producing the same and a multilayer ceramic capacitor using the dielectric ceramic. Specifically, it relates to improvement for advantageously reducing the thickness of dielectric ceramic layers of multilayer ceramic capacitors.

2. Description of the Related Art

Multilayer ceramic capacitors are generally produced in the following manner.

Initially, ceramic green sheets comprising a dielectric ceramic material are prepared. Each of the ceramic green sheets carries a patterned conductive material to constitute an inner electrode on a surface thereof. A dielectric ceramic mainly containing, for example, $BaTiO_3$ is used in this procedure.

Plural plies of the ceramic green sheets including the ceramic green sheets carrying the conductive material are laminated and thermo-compressed to thereby yield a monolithic multilayer green compact.

Next, the multilayer green compact is fired to thereby yield a multilayer sintered compact (hereinafter briefly referred to as "laminate"). The laminate includes inner electrodes comprising the conductive material.

Outer electrodes are then formed on outer surfaces of the laminate so as to be electrically connected to specific ones of the inner electrodes. The outer electrodes are formed, for example, by applying a conductive paste containing a conductive metal powder and a glass frit to outer surfaces of the laminate and baking the applied conductive paste.

To minimize the production cost of a multilayer ceramic capacitor, nickel, copper and other base metals that are available at relatively low cost have been frequently used as the conductive material for the inner electrodes. However, upon the production of a multilayer ceramic capacitor including inner electrodes composed of a base metal, a multilayer green compact must be fired in a neutral or reducing atmosphere in order to avoid oxidation of the base metal during the firing operation. Accordingly, a dielectric ceramic used in the multilayer ceramic capacitor must be resistant to reduction.

Miniaturization of electronic parts has rapidly advanced in recent years accompanying the expansion of electronics, and multilayer ceramic capacitors must be miniaturized and must have larger capacities.

Accordingly, strong demands have been made for dielectric ceramics that have a high dielectric constant, low rates of temperature-dependent and time-dependent changes in dielectric constant even in such a firing atmosphere that a base metal for use in inner electrodes is not oxidized. These dielectric ceramics must have a high electrical insulating property and satisfactory reliability even when the thickness of constitutional dielectric ceramic layers is reduced. However, conventional dielectric ceramics do not necessarily satisfy these requirements.

For example, Japanese Unexamined Patent Application Publications No. 5-9066, No. 5-9067 and No. 5-9068 propose, as the dielectric ceramics being resistant to reduction, compositions each including $BaTiO_3$, a rare earth metal oxide and $Co_2O_3$. However, these dielectric ceramics do not sufficiently satisfy the demands of the market in reliability when the thickness of the constitutional dielectric ceramic layers is reduced to, for example, 5 $\mu$m or less and specifically 3 $\mu$m or less, although these dielectric ceramics satisfy X7R characteristic specified by EIA specifications and exhibit high electrical insulation property.

Japanese Unexamined Patent Application Publications No. 6-5460 and No. 9-270366 each propose a dielectric ceramic having a high dielectric constant, a low rate of temperature-dependent change in dielectric constant and a long high-temperature load life. The dielectric ceramic described in the former publication exhibits decreased reliability with decreasing thickness of the dielectric ceramic layers and has a high rate of time-dependent change in electrostatic capacity, since the $BaTiO_3$ powder used in the dielectric ceramic has a large particle size. Likewise, the dielectric ceramic described in the latter publication exhibits decreased reliability with decreasing thickness of the dielectric ceramic layers and has a high rate of time-dependent change in electrostatic capacity under the application of a direct-current voltage.

When the thickness of dielectric ceramic layers is reduced in order to decrease the size of and to increase the capacity of the resulting multilayer ceramic capacitor, and the same rated voltage as that before reduction of the thickness is applied thereto, the field intensity applied per constitutional layer of the dielectric ceramic layers increases and insulation resistance at room temperature and at high temperatures decreases to thereby markedly decrease reliability of the resulting dielectric ceramic capacitor. Accordingly, the rated voltage must be decreased when the thickness of multilayer dielectric ceramic layers comprising a conventional dielectric ceramic is decreased.

Demands have therefore been made on a multilayer ceramic capacitor which does not require a reduced rated voltage even when the thickness of dielectric ceramic layers is reduced, has a high insulation resistance at a high field intensity and is satisfactory in reliability.

Multilayer ceramic capacitors are generally used under the application of a direct-current voltage and vary in electrostatic capacity with time under this condition. However, as the thickness of each of the dielectric ceramic layers of the multilayer ceramic capacitor is reduced in order to reduce the size of and to increase the capacity of the multilayer ceramic capacitor, the direct-current field intensity per a constitutional layer of the dielectric ceramic layers increases, and time-dependent change in electrostatic capacity further increases.

Demands have therefore been made on a multilayer ceramic capacitor which exhibits less time-dependent change in electrostatic capacity under the application of a direct-current voltage.

SUMMARY OF THE INVENTION

Accordingly, it is an object of the present invention to provide a dielectric ceramic and a process for producing the same, which dielectric ceramic has a high dielectric constant, exhibits less temperature-dependent change and time-dependent change under the application of a direct-current voltage, has a low dielectric loss, has a high product of insulation resistance (R) and electrostatic capacity (C) (CR product) and has a long life in insulation resistance at high temperatures and at high voltages, as well as to provide a multilayer ceramic capacitor using the dielectric ceramic.

Specifically, the present invention provides, in an aspect, a dielectric ceramic including $ABO_3$ as a major component, and R and M as accessory components, where A is at least one of Ba, Sr and Ca; B is at least one of Ti, Zr and Hf; R is at least one of La, Ce, Pr, Nd, Sm, Eu, Gd, Tb, Dy, Ho, Er, Tm, Yb, Lu and Y; and M is at least one of Ni, Co, Fe, Cr and Mn. The dielectric ceramic has crystal grains including $ABO_3$ as a major component, and grain boundaries constituting interfaces between the crystal grains. In the dielectric ceramic, when the grain boundaries are analyzed at respective four points which equally divide a periphery of each of plural crystal grains selected arbitrarily form the crystal grains, the R and M exist at 70% or more of the sum of the respective four points.

The invented dielectric ceramic may further include Si as an accessory component. In this case, when the grain boundaries are analyzed at respective four points which equally divide a periphery of each of plural crystal grains selected arbitrarily form the crystal grains, the R, M and Si exist at about 70% or more of the sum of the respective four points.

The grain boundaries are preferably analyzed by an energy dispersion X-ray analysis method.

By these configurations, the resulting dielectric ceramic has a high dielectric constant, exhibits less temperature-dependent change and time-dependent change in dielectric constant under the application of a direct-current voltage, has a low dielectric loss, has a high insulation resistance and has a long life in insulation resistance at high temperatures and at high voltages in spite of the fact that it is a dielectric ceramic resistant to reduction.

A preferred process for producing the dielectric ceramic includes, but is not limited to, the following process. The present invention also relates to such a process for producing a dielectric ceramic.

The process for producing a dielectric ceramic includes the steps of synthesizing and pulverizing $ABO_3$ to thereby yield an $ABO_3$ powder, preparing an R-containing compound and an M-containing compound, mixing the R-containing compound with the M-containing compound, calcining the resulting mixture and pulverizing the calcined mixture to thereby yield a calcined accessory-component powder; mixing the $ABO_3$ powder with the calcined accessory-component powder and forming the resulting mixture to thereby yield a green compact; and firing the green compact.

If a target dielectric ceramic includes Si as an accessory component as described above, a Si-containing compound such as $SiO_2$ is prepared and is added to the R-containing compound and the M-containing compound in the step of yielding a calcined accessory-component powder.

By these configurations, the resulting dielectric ceramic can have more uniform compositions in grain boundaries than that obtained by a process in which constitutional elements are mixed and reacted all at once. Accordingly, the invented process can easily provide a dielectric ceramic in which the components R and M or the components R, M and Si are contained at about 70% or more of analysis points in the grain boundaries.

The present invention also relates to a multilayer ceramic capacitor obtained by using the dielectric ceramic.

This invented multilayer ceramic capacitor includes a laminate and outer electrodes. The laminate includes a plurality of dielectric ceramic layers and inner electrodes, which dielectric ceramic layers are laminated, and which inner electrodes are formed along interfaces between the dielectric ceramic layers. The outer electrodes are formed on outer surfaces of the laminate so as to be electrically connected to specific ones of the inner electrodes. In this multilayer ceramic capacitor, the dielectric ceramic layers include the invented dielectric ceramic, and the inner electrodes include a base metal as a conductive component.

By using the invented dielectric ceramic as dielectric ceramic layers of a multilayer ceramic capacitor as above, the resulting multilayer ceramic capacitor can maintain its satisfactory reliability even when the thickness of the dielectric ceramic layers is reduced.

Thus, the resulting multilayer ceramic capacitor can include dielectric ceramic layers each having a reduced thickness, can be miniaturized and can have a larger capacity without any requirement to reduce the rated voltage of the multilayer ceramic capacitor. Consequently, the multilayer ceramic capacitor can include dielectric ceramic layers each having a reduced thickness of about 1 $\mu$m without any problem.

Additionally, the invented dielectric ceramic is a dielectric ceramic resistant to reduction, and a base metal can be used as a conductive component in inner electrodes of the multilayer ceramic capacitor without any problem.

DESCRIPTION OF THE PREFERRED EMBODIMENTS

Figure 1:
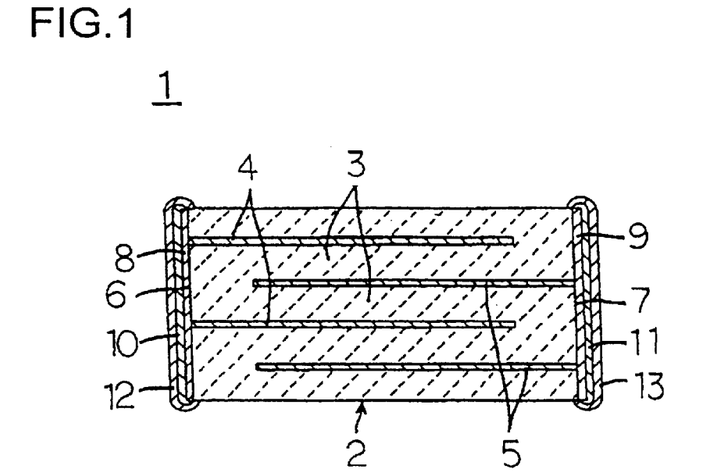
FIG. 1 is a sectional view illustrating a multilayer ceramic capacitor 1 as an embodiment according to the present invention.

FIG. 1 is a sectional view illustrating a multilayer ceramic capacitor 1 as an embodiment according to the present invention.

The multilayer ceramic capacitor 1 comprises a laminate 2. The laminate 2 includes a plurality of dielectric ceramic layers 3 and a plurality of inner electrodes 4 and 5. The dielectric ceramic layers 3 are laminated with one another, and the inner electrodes 4 and 5 are respectively formed along specific plural interfaces between the dielectric ceramic layers 3. The inner electrodes 4 and 5 extend to outer surfaces of the laminate 2 and are alternately arranged inside the laminate 2. Specifically, the inner electrodes 4 are derived from one end face 6 of the laminate 2, and the inner electrodes 5 are derived from the other end face 7.

Outer electrodes 8 and 9 are formed on the end faces 6 and 7, respectively, on outer surfaces of the laminate 2. Additionally, first metallic deposits 10 and 11 comprising a metal such as nickel or copper are formed on the outer electrodes 8 and 9, and second metallic deposits 12 and 13 comprising a metal such as solder or tin are formed on the first metallic deposits 10 and 11, respectively.

In the multilayer ceramic capacitor 1, the dielectric ceramic layers 3 comprise a dielectric ceramic, which dielectric ceramic comprises $ABO_3$ as a major component, and R and M as accessory components, where A is at least one of Ba, Sr and Ca; B is at least one of Ti, Zr and Hf; R is at least one of La, Ce, Pr, Nd, Sm, Eu, Gd, Tb, Dy, Ho, Er, Tm, Yb, Lu and Y; and M is at least one of Ni, Co, Fe, Cr and Mn.

The dielectric ceramic has crystal grains including $ABO_3$ as a major component, and grain boundaries constituting interfaces between the crystal grains. when the grain boundaries are analyzed at respective four points which equally divide a periphery of each of plural crystal grains selected arbitrarily form the crystal grains, the R and M exist at about 70% or more of a sum of the respective four points. In other words, the components R and M are contained in about 70% or more of regions in the grain boundaries in the dielectric ceramic.

The dielectric ceramic may further comprise Si as an accessory component. In this case, when the grain boundaries are analyzed at respective four points which equally divide a periphery of each of plural crystal grains selected arbitrarily form the crystal grains, the R, M and Si exist at about 70% or more of a sum of the respective four points.

If a dielectric ceramic comprise the components R and M, or the components R, M and Si, at less than about 70% of analysis points in the grain boundaries, the resulting dielectric ceramic exhibits a shortened life in insulation resistance at high temperatures and at high voltages in accelerated testing, has deteriorated reliability when the thickness of the dielectric ceramic layers 3 is reduced or exhibits increased time-dependent change in electrostatic capacity under the application of a direct-current voltage. These are shown in Experimental Example described later.

If the constitutional element A or B of the major component or Mg, V, B, Al and other elements are further contained in the grain boundaries, electrical properties of the resulting dielectric ceramic are not deteriorated.

The term "grain boundary" as used herein means a region formed between two crystal grains each comprising $ABO_3$ as a major component or means a region formed among three or more crystal grains ("a triple point"). More specifically, when a layer is crystallographically clearly observed between or among crystal grains in a cross section of the dielectric ceramic, this layer is defined as the grain boundary. Alternatively, when another layer is not observed between or among the crystal grains, and the crystal grains are directly joined with each other, a region 2 nm around a junction point or line is defined as the grain boundary.

The inner electrodes 4 and 5 comprise a base metal such as nickel, a nickel alloy, copper or a copper alloy as a conductive component.

The outer electrodes 8 and 9 comprise a sintered layer obtained by sintering a conductive metal powder or sintering a conductive metal powder including a glass frit.

The multilayer ceramic capacitor 1 can be produced by the following process.

Initially, a material powder for a dielectric ceramic constituting the dielectric ceramic layers 3 is prepared. The material powder is preferably prepared in the following manner. In this connection, a dielectric ceramic further comprising Si as an accessory component is taken as an example herein.

Initially, $ABO_3$ is synthesized and pulverized to thereby yield an $ABO_3$ powder.

Separately, a compound containing the component R (hereinafter referred to as "R-containing compound"), a compound containing the component M (hereinafter referred to as "M-containing compound" and a Si-containing compound are respectively prepared.

The R-containing compound, M-containing compound and Si-containing compound are mixed with one another, and the resulting mixture is calcined and pulverized to yield a calcined accessory-component powder.

The above-prepared $ABO_3$ powder is mixed with the calcined accessory-component powder, and the resulting powder mixture is used as the material powder for the dielectric ceramic.

When the $ABO_3$ powder and the calcined accessory-component powder are prepared separately and are mixed with each other to thereby yield a material powder as in the above process, the resulting dielectric ceramic can more easily have a relatively uniform distribution of the components R and M in grain boundaries thereof. The dielectric ceramic is obtained by forming the material powder to yield a green compact and firing the green compact.

In contrast, if a material powder for the dielectric ceramic is prepared by mixing all the components such as AO, $BO_2$, $R_2O_3$, MO and $SiO_2$ and reacting the mixture or by mixing all the components such as $ABO_3$, $R_2O_3$, MO and $SiO_2$ and reacting the mixture all at once, the grain boundaries of the resulting dielectric ceramic tend to have a nonuniform composition in the grain boundaries.

To reduce the thickness of the dielectric ceramic layers 3, the $ABO_3$ powder for use in the material powder for the dielectric ceramic preferably has a mean particle size of from about 0.05 to 0.7 $\mu$m. When an $ABO_3$ powder having a mean particle size within the above range is used as a material, the thickness of the dielectric ceramic layers 3 can be reduced to about 1 $\mu$m without problems.

Next, an organic binder and a solvent are added to and mixed with the powder mixture containing the $ABO_3$ powder and the calcined accessory-component powder to yield a slurry. This slurry is formed into ceramic green sheets to constitute the dielectric ceramic layers 3.

Films of a conductive paste to constitute the inner electrodes 4 and 5 are then respectively formed on specific ceramic green sheets by a printing process such as screen printing. These conductive paste films comprise nickel, a nickel alloy, copper or a copper alloy as a conductive component as described above. The inner electrodes 4 and 5 can also be formed by a technique other than the printing process. Such techniques include, for example, vapor deposition and plating.

Plural plies of the ceramic green sheets including those carrying the conductive paste film are laminated, thermally compressed and cut according to necessity. Thus, a multilayer green compact including plural ceramic green sheets and conductive paste films is obtained. The conductive paste films are formed along specific interfaces between the ceramic green sheets and will constitute the inner electrodes 4 and 5. One edge of each of the conductive paste films is exposed to one end face of the multilayer green compact.

The multilayer green compact is then fired in a reducing atmosphere to thereby yield a sintered laminate 2 as shown in FIG. 1. In the laminate 2, the ceramic green sheets constitute the dielectric ceramic layers 3, and the conductive paste films constitute the inner electrodes 4 and 5.

The outer electrodes 8 and 9 are then formed on the end faces 6 and 7 of the laminate 2 so as to be electrically connected to the exposed edges of the inner electrodes 4 and 5, respectively.

Materials for the outer electrodes 8 and 9 include the same materials as in the inner electrodes 4 and 5, as well as metals such as silver, palladium and silver-palladium alloys; and powders of these metals further comprising a glass frit such as a $B_2O_3$—$SiO_2$—BaO glass, $Li_2O$—$SiO_2$—BaO glass or $B_2O_3$—$Li_2O$—$SiO_2$—BaO glass. Appropriate materials are selected depending on the application and place to be used of the multilayer ceramic capacitor 1.

The outer electrodes 8 and 9 are generally formed by applying a paste containing a powder of a conductive metal to outer surfaces of the fired laminate 2 and baking the applied paste. Alternatively, they may be formed by applying the paste to outer surfaces of the multilayer green compact before firing and baking the paste concurrently with firing operation to yield the laminate 2.

Subsequently, the outer electrodes 8 and 9 are plated with, for example, nickel or copper to form the first metallic deposits 10 and 11. The first metallic deposits 10 and 11 are then plated with, for example, solder or tin to form the second metallic deposits 12 and 13. In some applications of the multilayer ceramic capacitor 1, the formation of conductive layers such as the metallic deposits 10 to 13 on the outer electrodes 8 and 9 may be omitted.

The dielectric ceramic constitutes the dielectric ceramic layers 3 of the multilayer ceramic capacitor 1 and has crystal grains comprising $ABO_3$ as a major component and grain boundaries constituting interfaces between or among the crystal grains. When the grain boundaries are analyzed at The multilayer ceramic capacitor 1 may further comprise impurities such as Al, Zr, Fe, Hf, Na and N that are contaminates during the production process thereof such as the preparation of the material powder for the dielectric ceramic. However, the contamination by such impurities does not significantly affect the electrical properties of the multilayer ceramic capacitor 1.

Likewise, the inner electrodes 4 and 5 may further comprise impurities such as Fe during the production process of the multilayer ceramic capacitor 1, but the contamination by these impurities does not significantly affect the electrical properties.

The advantages of the present invention will be illustrated with reference to an experimental example below.

EXAMPLE 1

A multilayer ceramic capacitor was produced in the following manner. In the present example, $BaTiO_3$ and $Dy_2$—($NiO$, $MnO_2$)—$SiO_2$ were respectively used as $ABO_3$ and accessory components. The composition is shown in Table 1. The contents of individual components in Table 1 are indicated in moles relative to 100 moles of $ABO_3$.

TABLE 1

EXPERIMENTAL EXAMPLE

| | | Major Component | | | Accessory Component | | | |
|---|---|---|---|---|---|---|---|---|
| | | $ABO_3$ | AO | BO | R | M | Si | Additional Component |
| 1 | Example | $100BaTiO_3$ | | | $1.0Dy_2O_3$ | $1.0NiO$ $0.5MnO_2$ | $2.0SiO_2$ | |
| | Comparative Example | $100BaTiO_3$ | $100BaO$ | $100TiO_2$ | $1.0Dy_2O_3$ | $1.0NiO$ $0.5MnO_2$ | $2.0SiO_2$ | |
| 2 | Example | $100(Ba_{0.97},Sr_{0.03})TiO_3$ | | | $0.5Sm_2O_3$ $0.5Ho_2O_3$ | $0.3MnO_2$ $0.2Fe_2O_3$ | | $0.5B_2O_3$, $1.5SiO_2$, $1.0MgO$ |
| | Comparative Example | $100(Ba_{0.97},Sr_{0.03})TiO_3$ | $97BaO$, $3SrO$ | $100TiO_2$ | $0.5Sm_2O_3$ $0.5Ho_2O_3$ | $0.3MnO_2$ $0.2Fe_2O_3$ | | $0.5B_2O_3$, $1.5SiO_2$, $1.0MgO$ |
| 3 | Example | $100$ $(Ba_{0.90},Ca_{0.10})(Ti_{0.90},Zr_{0.09},Hf_{0.01})O_3$ | | | $0.8Y_2O_3$ $0.25Tm_2O_3$ | $1.5NiO$ | $2.0SiO_2$ | $1.5MgO$ |
| | Comparative Example | $100$ $(Ba_{0.90},Ca_{0.10})(Ti_{0.90},Zr_{0.09},Hf_{0.01})O_3$ | $90BaO$, $10CaO$ | $90TiO_2$ $9ZrO_2$ $1HfO_2$ | $0.8Y_2O_3$ $0.25Tm_2O_3$ | $1.5NiO$ | $2.0SiO_2$ | $1.5MgO$ |
| 4 | Example | $100(Ba_{0.95},Sr_{0.05})(Ti_{0.95},Zr_{0.05})O_3$ | | | $1.2Er_2O_3$ | $1.0MnO_2$ | | $0.05V_2O_5$, $2.5SiO_2$, $0.5MgO$ |
| | Comparative Example | $100(Ba_{0.95},Sr_{0.05})(Ti_{0.95},Zr_{0.05})O_3$ | | | $1.2Er_2O_3$ | $0.5MgO$ | | $0.05V_2O_5$, $2.5SiO_2$, $1.0MnO_2$ |
| 5 | Example | $100(Ba_{0.97},Sr_{0.03})TiO_3$ | | | $1.5Yb_2O_3$ | $1.0CoO$ $0.5Cr_2O_3$ | $1.0SiO_2$ | $0.1B_2O_3$, $0.8MgO$ |
| | Comparative Example | $100(Ba_{0.97},Sr_{0.03})TiO_3$ | | | $1.5Yb_2O_3$ | $0.8MgO$ | $1.0SiO_2$ | $0.1B_2O_3$, $1.0CoO$, $0.5Cr_2O_3$ | respective four points which equally divide a periphery of each of plural crystal grains selected arbitrarily form the crystal grains, the R, M and Si exist at about 70% or more of a sum of the respective four points. By this configuration, the dielectric ceramic constituting the dielectric ceramic layers 3 has a high dielectric constant, exhibits less temperature-dependent change and time-dependent change in dielectric constant under the application of a direct-current voltage, has a low dielectric loss, has a high insulation resistance and has a long accelerated life in insulation resistance at high temperatures and at high voltages. Accordingly, the multilayer ceramic capacitor 1 has satisfactory reliability even if the thickness of the dielectric ceramic layers 3 is reduced. These are shown in Experimental Example described below.

Initially, $TiCl_4$ and $Ba(NO_3)_2$ as starting materials for the major component were weighed and were reacted with oxalic acid to thereby yield a precipitate of barium titanyl oxalate tetrahydrate, $BaTiO(C_2O_4) \cdot 4H_2O$. The precipitate was thermally decomposed at a temperature of 1000° C. or higher to yield $BaTiO_3$, and $BaTiO_3$ was pulverized to thereby yield a $BaTiO_3$ powder.

Separately, $Dy_2O_3$, $NiO$, $MnO_2$ and $SiO_2$ as accessory components were wet-mixed in a ball mill in the compositional ratio shown in Table 1, the resulting mixture was calcined at a temperature of 1000° C. for 2 hours and was pulverized to thereby yield a calcined accessory-component powder.

The $BaTiO_3$ powder and the calcined accessory-component powder were mixed in the compositional ratio shown in Table 1 to thereby yield a powder mixture as a material powder for a dielectric ceramic.

Next, a poly(vinyl butyral) binder and an organic solvent such as ethanol were added to and wet-mixed with the powder mixture in a ball mill to thereby yield a ceramic slurry.

The ceramic slurry was formed into sheets by doctor blade process to such a thickness that the resulting dielectric ceramic layer after firing has a thickness of 2 $\mu$m to thereby yield rectangular ceramic green sheets.

A conductive paste mainly containing nickel was then applied to some of the ceramic green sheets by screen printing to thereby yield conductive paste films to constitute inner electrodes.

Plural plies of the ceramic green sheets including those carrying the conductive paste film were laminated in such a manner that conductive paste films were alternately derived from the right and left sides of the resulting laminate to thereby yield a multilayer green compact.

The multilayer green compact was heated at a temperature of 350° C. in an atmosphere of nitrogen gas to burn out the binder and was fired at a temperature shown in Table 2 below in a reducing atmosphere composed of $H_2$, $N_2$ and $H_2O$ gases at a partial pressure of oxygen of $10^{-9}$ to $10^{-12}$ MPa for 2 hours to yield a multilayer sintered compact.

A conductive paste containing silver as a conductive component and a $B_2O_3$—$Li_2O$—$SiO_2$—$BaO$ glass frit was applied to both end faces of the multilayer sintered compact and was baked at a temperature of 600° C. in an atmosphere of nitrogen gas to yield outer electrodes electrically connected to the inner electrodes.

The above-prepared multilayer ceramic capacitor had outer dimensions of 1.6 mm in width, 3.2 mm in length and 1.2 mm in thickness, and each of dielectric ceramic layers interposed between the inner electrodes had a thickness of 2 mm. The multilayer ceramic capacitor included 100 plies of effective dielectric ceramic layers with an area of counter electrode per layer of 2.1 mm².

Comparative Example 1

A multilayer ceramic capacitor was produced in the same manner as in Example 1 using a material powder having the same composition as in Example 1, except that the material powder was prepared by mixing $BaCO_3$, $TiO_2$, $Dy_2O_3$, $MnO_2$ and $SiO_2$ all at once, calcining the resulting mixture at 1000° C. and pulverizing the calcined mixture.

TABLE 2

| | | Firing Temperature (° C.) | Dielectric Constant $\epsilon$ | tan δ (%) | CR Product (ΩF) | Temperature Characteristics $\Delta C/C_{20}$ (%) | | Temperature Characteristics $\Delta C/C_{25}$ (%) | | High-temperature Load Life (hr) | Time-dependent Change in Electrostatic Constant (%) |
|---|---|---|---|---|---|---|---|---|---|---|---|
| | | | | | | −25° C. | 85° C. | −55° C. | 125° C. | | |
| 1 | Example | 1180 | 3310 | 2.4 | 8850 | −6.5 | −6.5 | −8.3 | −12.0 | 220 | −1.5 |
| | Comparative Example | 1180 | 3350 | 2.2 | 3810 | −7.0 | −10.0 | −8.9 | −13.9 | 21 | −19.3 |
| 2 | Example | 1200 | 2880 | 1.5 | 9500 | −5.5 | −5.6 | −5.0 | −11.6 | 170 | −1.3 |
| | Comparative Example | 1200 | 3150 | 2.0 | 4890 | −6.2 | −7.2 | −6.2 | −14.1 | 9 | −15.2 |
| 3 | Example | 1200 | 2570 | 1.4 | 7980 | −3.2 | −4.5 | −4.5 | −10.6 | 230 | −1.1 |
| | Comparative Example | 1200 | 2670 | 1.6 | 5200 | −3.5 | −4.4 | −6.1 | −13.6 | 22 | −12.3 |
| 4 | Example | 1160 | 2610 | 1.6 | 10040 | −3.4 | −2.2 | −3.8 | −11.1 | 190 | −1.8 |
| | Comparative Example | 1160 | 2730 | 1.7 | 4250 | −5.0 | −2.4 | −6.6 | −14.5 | 10 | −8.2 |
| 5 | Example | 1220 | 2890 | 2.6 | 8640 | −7.3 | −6.7 | −10.0 | −12.5 | 150 | −1.1 |
| | Comparative Example | 1220 | 2940 | 1.8 | 4570 | −7.3 | −7.9 | −10.5 | −13.5 | 8 | −6.2 |

EXAMPLE 2

A multilayer ceramic capacitor was produced in the same manner as in Example 1, except that $(Ba_{0.97}Sr_{0.03})TiO_3$ as the $ABO_3$ component and $(Sm_2O_3,Ho_2O_3)$—$(MnO_2,Fe_2O_3)$ as the accessory components were respectively used, that $B_2O_3$, $SiO_2$ and MgO as additional components were added to the material powder as shown in Table 1, and that the resulting multilayer ceramic capacitor was fired at the temperature shown in Table 2. In this procedure, $(Ba_{0.97}Sr_{0.03})TiO_3$ as the $ABO_3$ component was prepared by mixing BaO, SrO and $TiO_2$ and calcining the resulting mixture.

Comparative Example 2

A multilayer ceramic capacitor was produced in the same manner as in Example 2 using a material powder having the same composition shown in Table 1 as in Example 2, except that the material powder was prepared by mixing and calcining BaO, SrO, $TiO_2$, $Sm_2O_3$, $Ho_2O_3$, $MnO_2$ and $Fe_2O_3$ to yield a calcined powder and mixing the calcined powder with $SiO_2$, $B_2O_3$ and MgO powders to thereby yield the material powder.

EXAMPLE 3

A multilayer ceramic capacitor was produced in the same manner as in Example 1, except that $(Ba_{0.90}Ca_{0.10})(Ti_{0.90}Zr_{0.09}Hf_{0.01})O_3$ as the $ABO_3$ component, $(Y_2O_3, Tm_2O_3)$—NiO—$SiO_2$ as the accessory components and MgO as the additional component as shown in Table 1 were respectively used, and that the resulting multilayer ceramic capacitor was fired at the temperature shown in Table 2. In this procedure, $(Ba_{0.90}Ca_{0.10})(Ti_{0.90}Zr_{0.09}Hf_{0.01})O_3$ as the $ABO_3$ component was prepared by mixing BaO, CaO, $TiO_2$, $ZrO_2$ and $HfO_2$ and calcining the resulting mixture.

Comparative Example 3

A multilayer ceramic capacitor was produced in the same manner as in Example 3 using a material powder having the same composition shown in Table 1 as in Example 3, except that the material powder was prepared by mixing and calcining BaO, CaO, $TiO_2$, $ZrO_2$, $HfO_2$, $Y_2O_3$, $Tm_2O_3$, NiO and $SiO_2$ to yield a calcined powder and mixing the calcined powder with MgO powder to thereby yield the material powder.

EXAMPLE 4

A multilayer ceramic capacitor was produced in the same manner as in Example 1, except that $(Ba_{0.95}Sr_{0.05})(Ti_{0.95}Zr_{0.05})O_3$ as the $ABO_3$ component, $(Er_2O_3, MnO_2)$ as the accessory components and $V_2O_5$, $SiO_2$ and MgO as the additional components as shown in Table 1 were respectively used and that the resulting multilayer ceramic capacitor was fired at the temperature shown in Table 2. In this procedure, $(Ba_{0.95}Sr_{0.05})(Ti_{0.95}Zr_{0.05})O_3$ as the $ABO_3$ component was prepared by mixing BaO, SrO, $TiO_2$ and $ZrO_2$ and calcining the resulting mixture.

Comparative Example 4

A multilayer ceramic capacitor was produced in the same manner as in Example 4 using a material powder having the same composition shown in Table 1 as in Example 4, except that the material powder was prepared by mixing a previously prepared $(Ba_{0.95}Sr_{0.05})(Ti_{0.95}Zr_{0.05})O_3$ as the $ABO_3$ component with $Er_2O_3$ and MgO, calcining the resulting mixture and adding $V_2O_5$, $SiO_2$ and $MnO_2$ as additional components to the calcined powder to thereby yield the material powder.

EXAMPLE 5

A multilayer ceramic capacitor was produced in the same manner as in Example 1, except that $(Ba_{0.97}Sr_{0.03})TiO_3$ as the $ABO_3$ component, $Yb_2O_3$—$(CoO, Cr_2O_3)$—$SiO_2$ as the accessory components and $B_2O_3$ and MgO as the additional components as shown in Table 1 were respectively used, and that the resulting multilayer ceramic capacitor was fired at the temperature shown in Table 2. In this procedure, $(Ba_{0.97}Sr_{0.03})TiO_3$ as the $ABO_3$ component was prepared by mixing BaO, SrO and $TiO_2$ and calcining the resulting mixture.

Comparative Example 5

A multilayer ceramic capacitor was prepared in the same manner as in Example 5 using a material powder having the same composition shown in Table 1 as in Example 5, except that the material powder was prepared by mixing a previously prepared $(Ba_{0.97}Sr_{0.03})TiO_3$ powder, a previously synthesized calcined $Yb_2O_3$—MgO—$SiO_2$ powder, a $B_2O_3$ powder, a CoO powder and a $Cr_2O_3$ powder to thereby yield the material powder.

Evaluations

The properties of the multilayer ceramic capacitors according to Examples 1 to 5 and Comparative Examples 1 to 5 were evaluated.

Initially, the dielectric constant $\in$, dielectric loss (tan $\delta$) and insulation resistance of the multilayer ceramic capacitors were determined. The dielectric constant $\in$ and dielectric loss (tan $\delta$) were determined at a temperature of 25° C. at 1 kHz at 1 V rms. The insulation resistance was determined at a field intensity of 4 kV/mm by applying a direct-current voltage of 20 V to a sample for 2 minutes and determining the insulation resistance at +25° C. and calculating the product of electrostatic capacity (C) and insulation resistance (R), i.e., the CR product.

Temperature-dependent changes in electrostatic capacity of the multilayer ceramic capacitors were determined by evaluating changes in electrostatic capacity at −25° C. and at 85° C. with reference to an electrostatic capacity at 20° C. ($\Delta C/C_{20}$) and changes in electrostatic capacity at −55° C. and at 125° C. with reference to an electrostatic capacity at 25° C. ($\Delta C/C_{25}$).

The multilayer ceramic capacitors were subjected to a test for high-temperature load life. In this test, a voltage of 30 V was applied to each 36 samples at 150° C. so that a field intensity became 15 kV/mm, and time-dependent changes in insulation resistance of the samples were determined. In this procedure, the time when insulation resistance of each sample became 200 kΩ or less was defined as the life time, and the mean of life times of 36 samples was defined as the high-temperature load life.

Time-dependent changes in electrostatic capacity of the multilayer ceramic capacitors were determined by applying a direct-current voltage of 3.15 V to a sample at a temperature of 125° C. at 1 kHz at 1 V rms, measuring the change in electrostatic capacity after 60-hour application of the direct-current voltage and determining the rate of change in electrostatic capacity with reference to an electrostatic capacity at 125° C. immediately after the application of the direct-current voltage.

Table 2 shows the determined dielectric constant $\in$, tan $\delta$, the product of electrostatic capacity-resistance (CR product), temperature characteristics as temperature-dependent changes in electrostatic capacity ($\Delta C/C_{20}$ and $\Delta C/C_{25}$), high-temperature load life and time-dependent change in electrostatic capacity.

Separately, fine structures of dielectric ceramic layers constituting the multilayer ceramic capacitors according to Examples 1 to 5 and Comparative Examples 1 to 5 were determined in the following manner:

Each of the multilayer ceramic capacitors was ground into a slice and was subjected to elementary analysis at plural analysis points in grain boundaries by energy-dispersive X-ray spectroscopy (EDX) using a transmission electron microscope. More specifically, four points were determined by dividing the outer periphery of a crystal grain observed in the field of view with an area into nearly equal four parts and were defined as the analysis points. Where necessary, the length of the outer periphery of the crystal grain was obtained by appropriate approximate calculation, and the four analysis points were determined by dividing the calculated outer periphery into nearly equal four parts. Some analysis points were selected in a region formed by two crystal grains and others were selected in a region formed by three or more crystal grains. Only one analysis point per grain boundary formed by the same crystal grains was analyzed. In this analysis, a 2-nm electron beam probe was used.

Table 3 shows the percentages (%) of analysis points, where each of the components R, M and Si was detected alone or in combination, of the samples according to Examples 1 to 5 and Comparative Examples 1 to 5.

TABLE 3

| | | Total of C2 or C3 | Three Components (C3) R + M + Si | Two Components (C2) | | | One Component | | |
|---|---|---|---|---|---|---|---|---|---|
| | | | | R + M | R + Si | M + Si | R | M | Si |
| 1 | Example | 93 | 90 | 3 | 1 | 3 | 0 | 0 | 3 |
| | Comparative Example | 40 | 23 | 17 | 20 | 15 | 10 | 7 | 8 |
| 2 | Example | 73 | 72 | 1 | 5 | 6 | 6 | 4 | 6 |
| | Comparative Example | 58 | 47 | 11 | 12 | 14 | 8 | 6 | 2 |
| 3 | Example | 80 | 73 | 7 | 8 | 3 | 5 | 3 | 1 |
| | Comparative Example | 58 | 43 | 15 | 18 | 15 | 2 | 2 | 5 |
| 4 | Example | 87 | 80 | 7 | 5 | 5 | 3 | 0 | 0 |
| | Comparative Example | 35 | 20 | 15 | 20 | 20 | 5 | 10 | 10 |
| 5 | Example | 77 | 75 | 2 | 4 | 6 | 5 | 2 | 6 |
| | Comparative Example | 41 | 18 | 23 | 15 | 15 | 13 | 10 | 6 |

Figure 2:
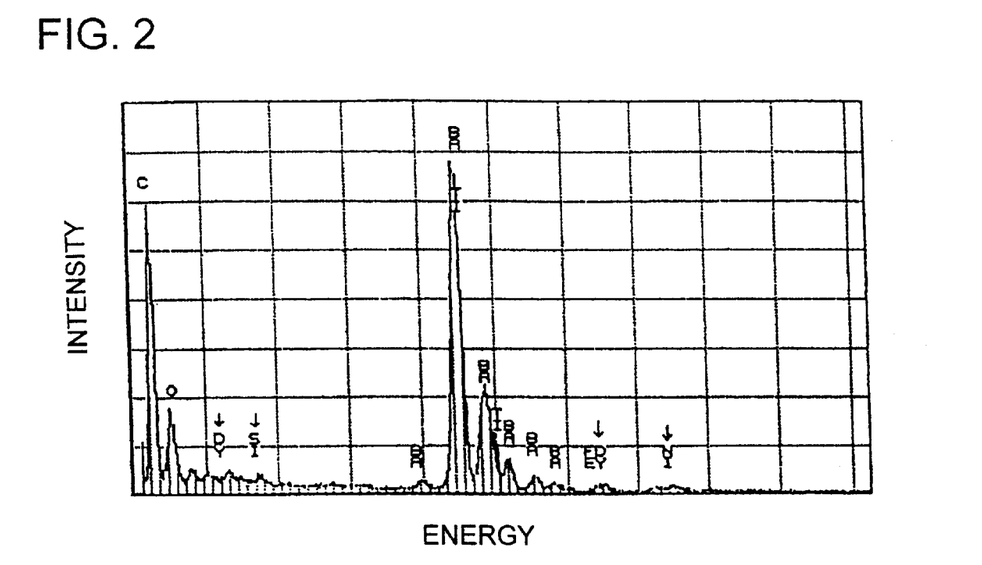
FIG. 2 is a diagram showing a spectrum determined by energy dispersive X-ray spectroscope (EDX) at a specific analysis point in a grain boundary between dielectric ceramic layers of a multilayer ceramic capacitor according to Example 1.
Figure 3:
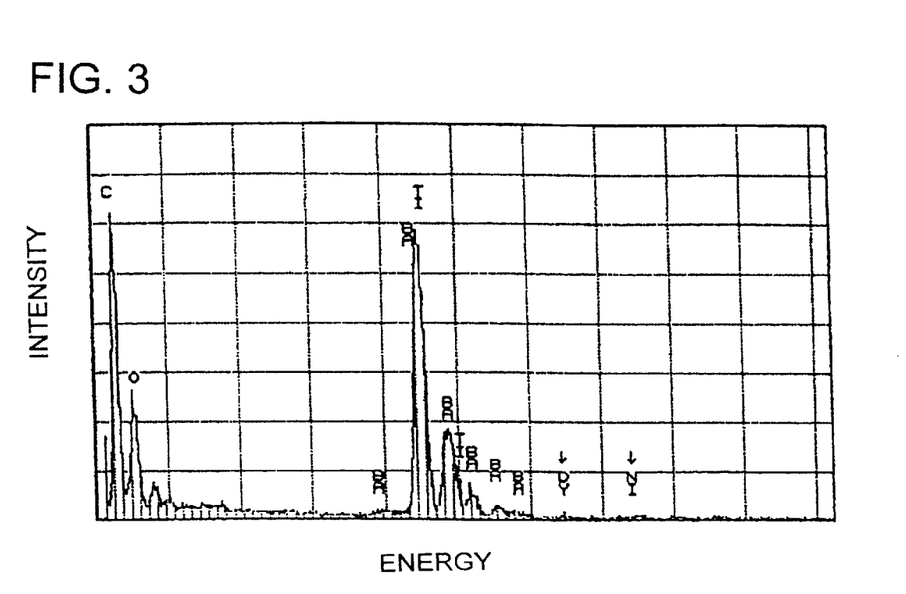
FIGS. 3 to 5 are diagrams showing EDX spectra at optional first, second and third analysis points, respectively, in a grain boundary among dielectric ceramic layers of a multilayer ceramic capacitor according to Comparative Example 1.
Figure 4:
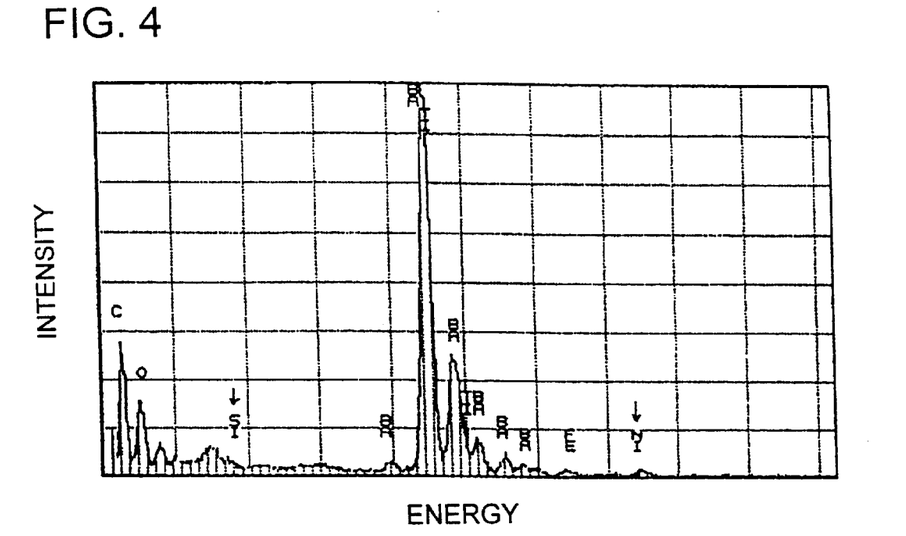
Figure 5:
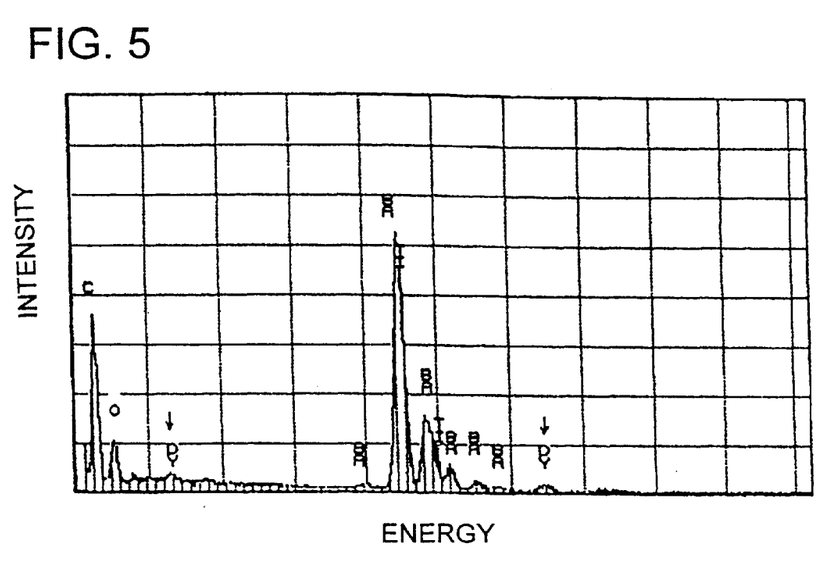

FIG. 2 shows an EDX spectrum of a sample according to Example 1 at an analysis point, and FIGS. 3 to 5 show EDX spectra of a sample according to Comparative Example 1 at three analysis points, respectively, as bases of the data shown in Table 3.

With reference to FIG. 2, peaks of Dy as the component R, of Ni as the component M and of Si were detected in the sample according to Example 1. Consequently, if such an EDX spectrum as shown in FIG. 2 is observed at a specific analysis point, it can be determined that the sample in question contains the three components R, M and Si at the analysis point.

Table 3 shows percentages of analysis points where each of the components R, M and Si were detected alone or in combination. This table shows that the total of analysis points where the two components R and M were detected, and analysis points where the tree components R, M and Si were detected, occupied 93% of the total analysis points in the sample according to Example 1.

In this connection, Fe detected in the spectrum shown in FIG. 2 is assumed to be an impurity during the preparation of the sample.

In contrast, analysis points showing an EDX spectrum as in FIG. 3, i.e., analysis points where peaks of Dy as the component R and of Ni as the component M were concurrently detected in the sample according to Comparative Example 1, were less in number and occupied only 40% of the total analysis points. The EDX spectrum shown in FIG. 3 was obtained by analyzing the sample at a point in a grain boundary formed among three crystal grains (i.e., "triple point").

In the sample according to Comparative Example 1, analysis points as shown in FIGS. 4 and 5 were large in number, where peak of Dy as the component R and of Ni or Mn as the component M were not concurrently detected. FIG. 4 shows an example of a spectrum at an analysis point where peaks of Ni as the component M and of Si alone were detected, and FIG. 5 shows an example of a spectrum at an analysis point where a peak of Dy as the component R alone was detected.

Table 3 also shows percentages of the analysis points in samples according to Examples 2 to 5 and Comparative Examples 2 to 5 in the same manner.

The results in Table 2 show that Examples 1 to 5 have markedly satisfactory characteristics in high-temperature load life and time-dependent change in electrostatic capacity and have satisfactory characteristics in dielectric constant $\in$, tan $\delta$, electrostatic capacity-resistance product (CR product) and temperature-dependent changes in electrostatic capacity when compared with corresponding Comparative Examples 1 to 5, respectively.

This is because the total of analysis points where the two components R and M were detected, and analysis points where three components R, M and Si were detected, occupy less than about 70% of the total analysis points in Comparative Examples 1 to 5, whereas the total occupy about 70% or more of the total analysis points in Examples 1 to 5 as shown in Table 3.

Other embodiments and variations will be obvious to those skilled in the art, and this invention is not to be limited to the specific matters stated above.

What is claimed is:

1. A dielectric ceramic comprising:
   crystal grains of $ABO_3$ having grain boundaries constituting interfaces between the crystal grains,
   where A is selected from the group consisting of Ba, Sr, Ca and combinations thereof, and B is selected from the group consisting of Ti, Zr, Hf and combinations thereof; and
   accessory components R and M,
   where R is selected from the group consisting of La, Ce, Pr, Nd, Sm, Eu, Gd, Tb, Dy, Ho, Er, Tm, Yb, Lu, Y and combinations thereof, and M is selected from the group consisting of Ni, Co, Fe, Cr, Mn and combinations thereof;
   wherein when the grain boundaries are analyzed at four points which about equally divide a periphery of each of a plurality of crystal grains, R and M exist at about 70% or more of the sum of the respective four points.

2. A dielectric ceramic according to claim 1, wherein A comprises Ba and B comprises Ti.

3. A dielectric ceramic according to claim 2, wherein R is selected from the group consisting of Sm, Dy, Ho, Er, Tm, Yb, Y and combinations thereof.

4. A dielectric ceramic according to claim 3, wherein B is Ti.

5. A dielectric ceramic according to claim 1, wherein the amount of R and M is less than about 5 moles per 100 moles of $ABO_3$.

6. A dielectric ceramic comprising:
   crystal grains of $ABO_3$ having grain boundaries constituting interfaces between the crystal grains,
   where A is selected from the group consisting of Ba, Sr, Ca and combinations thereof, and B is selected from the group consisting of Ti, Zr, Hf and combinations thereof; and accessory components R, M and Si, where R is selected from the group consisting of La, Ce, Pr, Nd, Sm, Eu, Gd, Tb, Dy, Ho, Er, Tm, Yb, Lu, Y and combinations thereof, and M is selected from the group consisting of Ni, Co, Fe, Cr, Mn and combinations thereof;

wherein when the grain boundaries are analyzed at four points which about equally divide a periphery of each of a plurality of crystal grains, R, M and Si exist at about 70% or more of the sum of the respective four points.

7. A dielectric ceramic according to claim 6, wherein A comprises Ba and B comprises Ti.

8. A dielectric ceramic according to claim 7, wherein R is selected from the group consisting of Sm, Dy, Ho, Er, Tm, Yb, Y and combinations thereof.

9. A dielectric ceramic according to claim 8, wherein B is Ti.

10. A dielectric ceramic according to claim 6, wherein the amount of R, M and Si is less than about 5 moles per 100 moles of $ABO_3$.

11. A process for producing a dielectric ceramic, the process comprising the steps of:

providing an $ABO_3$ powder, where A is selected from the group consisting of Ba, Sr, Ca and combinations thereof and B is selected from the group consisting of Ti, Zr, Hf and combinations thereof;

providing a calcined accessory-component powder comprising a calcined and pulverized mixture of an R-containing compound and an M-containing compound, where R is selected from the group consisting of La, Ce, Pr, Nd, Sm, Eu, Gd, Tb, Dy, Ho, Er, Tm, Yb, Lu, Y and combinations thereof, and M is selected from the group consisting of Ni, Co, Fe, Cr, Mn and combinations thereof;

mixing the $ABO_3$ powder with the calcined accessory-component powder and forming the resulting mixture to thereby yield a green compact; and firing the green compact.

12. A process for producing a dielectric ceramic according to claim 11, wherein A comprises Ba and B comprises Ti.

13. A process for producing a dielectric ceramic according to claim 11, wherein the amount of R and M is less than about 5 moles per 100 moles of $ABO_3$.

14. A process for producing a dielectric ceramic according to claim 11, wherein the $ABO_3$ powder has a mean particle size of about 0.05–0.7 µm.

15. A process for producing a dielectric ceramic according to claim 11, wherein the calcined accessory-component powder additionally comprises a Si-containing compound.

16. A process for producing a dielectric ceramic according to claim 15, wherein A comprises Ba and B comprises Ti.

17. A process for producing a dielectric ceramic according to claim 15, wherein the amount of R, M and Si compounds is less than about 5 moles per 100 moles of $ABO_3$.

18. A process for producing a dielectric ceramic according to claim 15, wherein the $ABO_3$ powder has a mean particle size of about 0.05–0.7 µm.

19. In a multilayer ceramic capacitor comprising a laminate having outer surfaces and comprising a plurality of dielectric ceramic layers, inner electrodes and outer electrodes, the dielectric ceramic layers being laminated with one another, the inner electrodes being at interfaces between dielectric ceramic layers and the outer electrodes being on outer surfaces of the laminate so as to be electrically connected to specific ones of the inner electrodes, the improvement which comprises the dielectric ceramic layers comprising the dielectric ceramic as claimed in claim 6 and the inner electrodes comprising a base metal.

20. In a multilayer ceramic capacitor comprising a laminate having outer surfaces and comprising a plurality of dielectric ceramic layers, inner electrodes and outer electrodes, the dielectric ceramic layers being laminated with one another, the inner electrodes being at interfaces between dielectric ceramic layers and the outer electrodes being on outer surfaces of the laminate so as to be electrically connected to specific ones of the inner electrodes, the improvement which comprises the dielectric ceramic layers comprising the dielectric ceramic as claimed in claim 1 and the inner electrodes comprising a base metal.

* * * * *